(No Model.)
J. C. BEEKMAN & H. G. HUBENER.
FLOAT VALVE FOR TANKS.
No. 449,242. Patented Mar. 31, 1891.
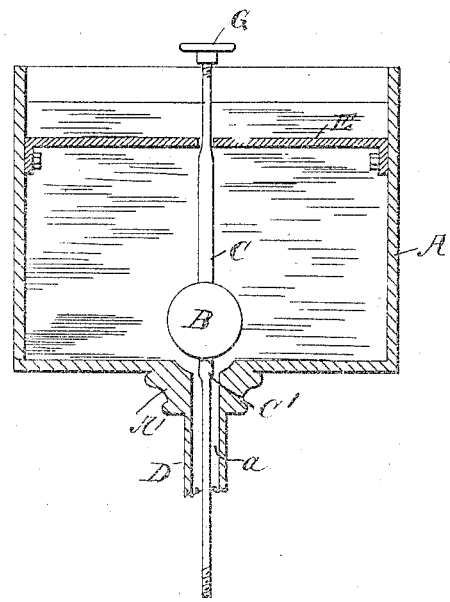

UNITED STATES PATENT OFFICE.

JOHN C. BEEKMAN AND HERMAN G. HUBENER, OF NEW YORK, N. Y.

FLOAT-VALVE FOR TANKS.

SPECIFICATION forming part of Letters Patent No. 449,242, dated March 31, 1891.

Application filed August 21, 1890. Serial No. 362,699. (No model.)

*To all whom it may concern:*

Be it known that we, JOHN C. BEEKMAN and HERMAN G. HUBENER, citizens of the United States, and residents of the city and county of New York, and State of New York, have invented a new and useful Improvement in Floatable Ball-Valves for Flushing-Tanks, &c.; and we do declare that the following is a full, clear, and exact description of the same.

Our invention relates to valves or stoppers for the outlets of service-tanks, stationary wash-bowls, and other plumbing fixtures; and it consists of the use of a floatable ball valve or stopper when the outlet of the fixture is below the body of the water.

In the accompanying drawing, which forms a part of this specification, a sectional view of the tank supplied with one valve is represented, in which—

A is the tank.

B is the ball float-valve; C C', the carrying-rod; D, the discharge-pipe; A', the valve-seat; a, the outlet, and E the guide-bar.

B is a water-tight metal sphere of sufficient buoyancy to float to the top of the water when released from its seat.

It is not essential that the valve be spherical or made of metal. Any other form of hollow float may be adopted and any other suitable material employed in its manufacture.

The bar E serves to perform a double function, not only being a guide for the carrying-rod C C', but also acting as a stop to regulate the extent to which the float-valve can be raised by means of the handle G, which is preferably constructed so as to be applied at will to either end of the rod C C' or other operating device, as a chain, lever, &c. Upon adjustment of the bar E and float B the action of ball and float valve may be regulated either, first, so that it will have but a small rise or fall, whereby when the raised handle G is released the suction of the escaping-water will immediately cause the valve to close again, or, second, so that the float B may be raised from its seat a sufficient distance for it to float upon the water, thereby securing an entire discharge, whereupon, when the contents of the tank have been sufficiently withdrawn, the float-valve will drop by its own weight back to its seat. For example, in the present instance the preferably tapering rod C can move but a short distance before becoming engaged with the guide bar and stop E, and the float-valve can consequently be raised but a very short distance from its seat; but upon reversing the position of the carrying-rod C C' the part C' will on account of its small diameter allow the float-valve to rise far enough to escape the suction action and to float upon the water, where it will remain until the tank is emptied.

By an adjustment of the guide bar and stop E and the float-valve B, which may engage directly with each other, a partial or practically entire discharge of the tank may thus be secured according to whether it is desired to have the water flow as long as the handle G is raised, or whether a certain fixed automatic discharge of water is wanted, a large or small flush thus being had upon raising or releasing the handle, as may be required by the circumstances of the case.

It is obvious that any other form of brace or bracket adapted to serve as a guide and stop may be substituted for the rod E.

Its mode of operation is as follows: When the tank is empty, the ball is lowered into its seat. It retains its position while the water rises around it and after the tank has become full by the pressure of the water upon it. When it is desired to discharge the water from the cistern, the valve is lifted by means of the handle G, by the manipulation of which a partial or entire discharge may be had, as and in the manner hereinbefore set forth.

One of the essential features of our invention consists of the fact that the ball-valve and rod secured rigidly thereto are reversible, and the action of the ball may thereby be regulated either, first, (when in its first position,) so that it cannot rise above the suction of the escaping water, which will draw the valve to its seat upon the handle being released, a partial discharge of the tank being thus secured, or, second, (when in its second position,) so that the ball will rise a sufficient distance to float upon the water, falling of its own weight into its seat upon the escape of the water, a full discharge being thus had upon raising and releasing the float-valve handle.

Having now described our invention, what we claim, and desire to secure by Letters Patent, is—

In combination with a tank having a bottom outlet forming a valve-seat and an elevated bar extending from side to side, the reversible float-valve consisting of a float-ball fixed on a stem, the ends of said stem extending one up through the cross-bar and the other down into the outlet, both ends of the stem being shouldered and one shoulder being nearer the ball than the other, all for the purpose stated and substantially as described.

JOHN C. BEEKMAN.
HERMAN G. HUBENER.

Witnesses:
LILLIE BEEKMAN,
J. ALEXANDER KOONES.